No. 659,879. Patented Oct. 16, 1900.
A. UBBELOHDE.
APPARATUS FOR CLEANSING FIBROUS MATERIALS.
(Application filed Apr. 12, 1900.)
(No Model.) 2 Sheets—Sheet 1.
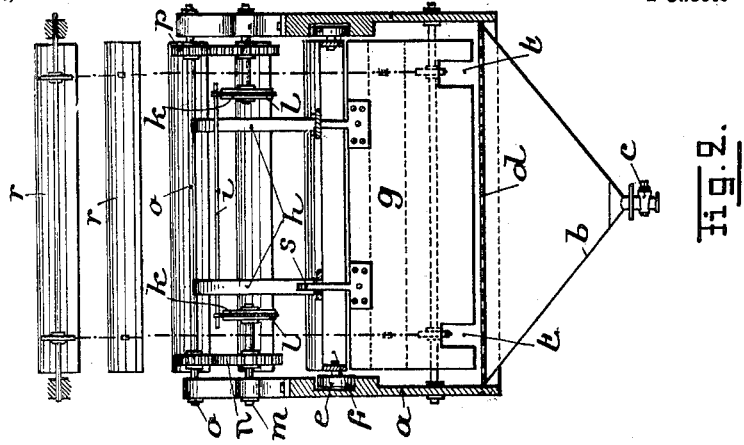
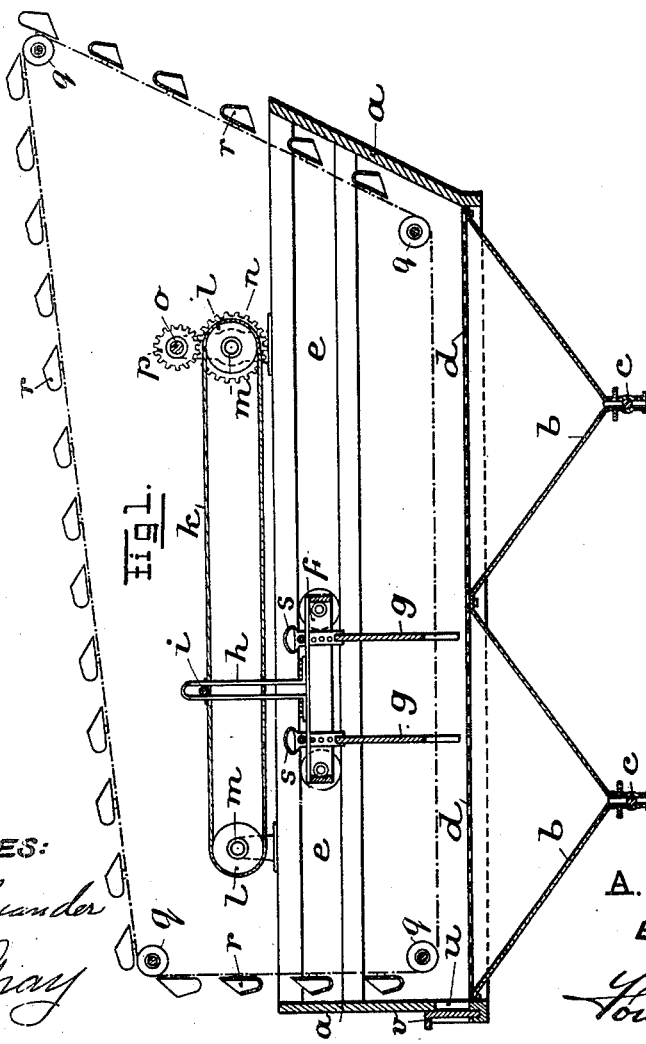
WITNESSES:
W. A. Alexander
Roy Gray
INVENTOR:
A. Ubbelohde
BY ATTORNEYS
Fowler & Fowler No. 659,879. Patented Oct. 16, 1900.
A. UBBELOHDE.
APPARATUS FOR CLEANSING FIBROUS MATERIALS.
(Application filed Apr. 12, 1900.)
(No Model.) 2 Sheets—Sheet 2.
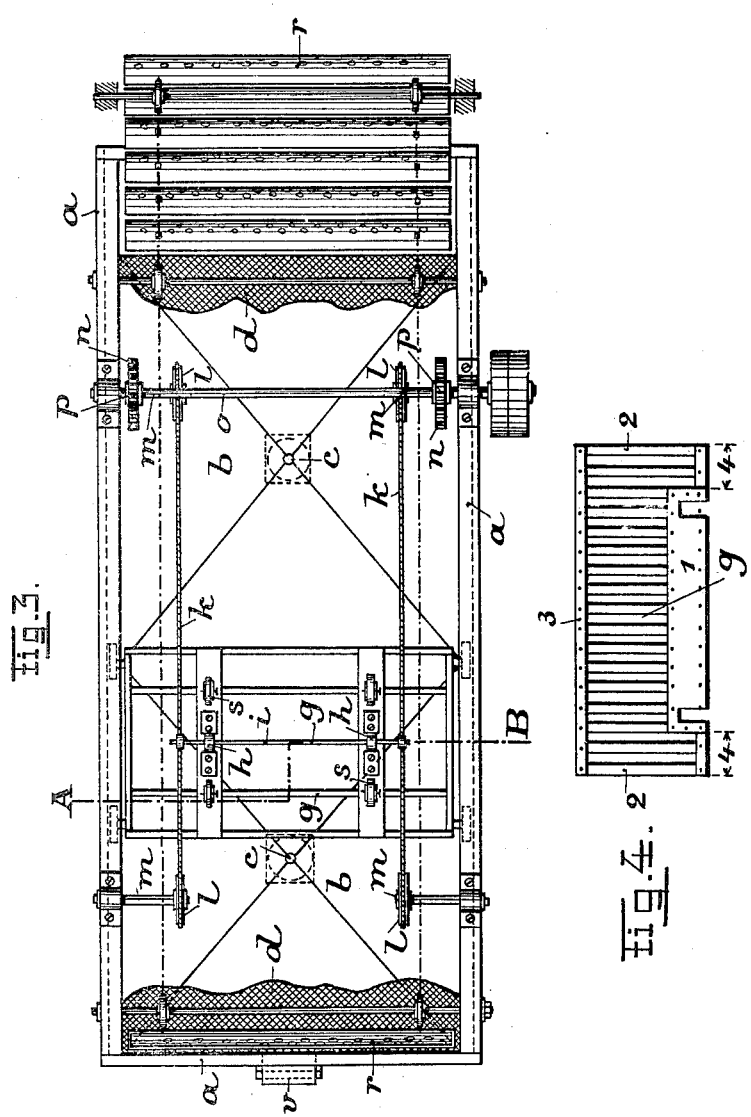
WITNESSES:
INVENTOR:
A. Ubbelohde
BY ATTORNEYS

United States Patent Office.

AMELIA UBBELOHDE, OF CELLE, GERMANY.

APPARATUS FOR CLEANSING FIBROUS MATERIALS.

SPECIFICATION forming part of Letters Patent No. 659,879, dated October 16, 1900.

Application filed April 12, 1900. Serial No. 12,519. (No model.)

*To all whom it may concern:*

Be it known that I, AMELIA UBBELOHDE, a subject of the German Emperor, residing at Celle, Villa Wester Celle, Germany, have invented certain new and useful Apparatus for Cleansing Fibrous Materials; and I do hereby declare the following to be a full, clear, and exact description of the invention, such as will enable others skilled in the art to which it appertains to make and use the same.

My invention relates to an apparatus for cleansing wool or other fibrous materials by means of which the smaller particles of dirt and dust are separated from the longer fibers, which are then collected.

The apparatus consists of a box-like receptacle, the bottom of which is of a funnel shape and is covered by a sieve, over which works a reciprocating stirring device and a chain-bucket device arranged to travel through the receptacle.

The said apparatus is shown on the accompanying drawings, in which—

Figure 1 shows a vertical longitudinal section; Fig. 2, a cross-section on line A B, Fig. 3, which shows a plan view. Fig. 4 is a modified form of the stirring-blades $g$.

The box-like receptacle $a$ has its bottom formed as two funnels $b$, provided with discharge-cocks $c$ and covered by a sieve $d$, upon which is placed the fibrous material to be cleansed, the water for this purpose being admitted at the upper part of the receptacle through a pipe. (Not shown.) Within the receptacle is a carriage $f$, running to and fro on rollers in guides $e$ and carrying pendent stirring-blades $g$. On the carriage are fixed two looped uprights $h$, with which is engaged a bar $i$, the ends of which are secured to endless cords or chains $k$, stretched over rollers $l$ on the shafts $m$. On the one shaft $m$ are fixed two toothed wheels $n$, with which gear pinions $p$, fixed on the shaft $o$, the latter being driven by any suitable driving-gear, such as by fast and loose belt-pulleys, as shown.

An advantageous form of the stirring-blades is shown in Fig. 4.

3 is a frame with vertical rods 2, which therefore form a series of vertical slits. In the middle of the stirring-blade the rods 2 do not reach the under end of the frame, but there a cross-piece 1 is placed which has no slits. Aside of the cross-piece 1 slits again are provided at 4.

Through the receptacle pass chain-buckets led over guide-rollers $q$, driven in any suitable manner and whose buckets $r$ have a sieve-like or perforated bottom. The chains of the chain-buckets have no buckets upon one part of their length, which corresponds about with the length of the receptacle $a$.

The action of the apparatus is as follows: The fibers to be cleansed are introduced, together with water, into the receptacle $a$, the parts of the chains having no buckets being at that time situated within receptacle $a$ over the sieve $d$ and the vertically-adjustable stirring-blades $g$ having been moved by their handles $s$ into their lowest position on the carriage. The shaft $o$ is then rotated, whereby the cords or chains $k$ are made to travel, carrying with them the bar $i$, which in its turn causes the loops $h$ and carriage $f$ to travel along first in one direction and then after bar $i$ has passed round the pulleys $l$ at the one end it propels the carriage in the contrary direction, so that by this means the stirring-blades $g$ have a corresponding to-and-fro motion imparted to them. In this motion the blades travel with notched parts $t$ over the bucketless parts of the chains of the chain-buckets, which parts, as above stated, are at that time situated over the sieve and are without motion. By the effectual stirring to which the fibers are by this means subjected the finer particles of dirt and dust are separated from the longer fibers and fall through the sieve $d$ into the funnels $b$, whence they are discharged from time to time, together with the water, through the cocks $c$. The cleansing having thus been effected, the stirring apparatus is stopped and the chain-buckets are set in motion through the receptacle $a$. To enable this to be done, the stirring-blades $g$ require first to be raised up by means of the handles $s$ and to be secured in their raised position by suitable means, such as by pins passed through holes therein. The chain-buckets can then travel along underneath the stirring-blades, and in doing so they scoop up the cleansed fibers, together with the water, and carry the same up and away out of the apparatus, the water draining off through the sieve-bottoms and falling into the receptacle *a* again. On passing over the upper right-hand guide-rollers the buckets will have their position reversed, so that the fiber falls out of them, after which they pass down into the receptacle again until all the cleansed fibers have been removed.

At the one side of the receptacle *a* is provided an opening *u*, which is closed by a valve or slide *v*, on opening which water may be injected by a syringe or the like for cleansing the receptacle, such water flowing off again through the said opening.

Having now particularly described and ascertained the nature of this invention and in what manner the same is to be performed, I declare that what I claim is—

1. Apparatus for cleansing fibrous materials consisting of a receptacle provided with a sieve-bottom in combination with a stirring apparatus and a chain-bucket device which are alternately put in action.

2. Apparatus for cleansing fibrous materials consisting of a receptacle provided with a sieve-bottom in combination with a stirring apparatus and a chain-bucket device, which is so arranged that a part of the chain is without buckets, such part being situated within the receptacle at the time when the stirring apparatus is being moved to and fro for the purpose not to disturb the action of the latter.

3. In an apparatus for cleansing fibrous material, a receptacle for the material, a conveyer for removing the material from said receptacle, a stirring device normally in the path of said conveyer, and means for moving said stirring device out of the path of said conveyer.

4. In an apparatus for cleaning fibrous material, a receptacle provided with a sieve-bottom, a conveyer for removing the fibrous material, a stirrer-blade normally in the path of said conveyer, means for reciprocating said blade and means for raising and lowering said blade.

In witness whereof I have hereunto set my hand in presence of two witnesses.

AMELIA UBBELOHDE.

Witnesses:
LEONORE KASCH,
JAY WHITE.